United States Patent [19]
Suzuki et al.

[11] Patent Number: 5,573,831
[45] Date of Patent: Nov. 12, 1996

[54] OPTICAL RECORDING MEDIUM

[75] Inventors: Yuko Suzuki, Kamakura; Shin Aihara; Sumio Hirose, both of Yokohama, all of Japan

[73] Assignee: Mitsui Toatsu Chemicals, Inc., Tokyo, Japan

[21] Appl. No.: 322,527

[22] Filed: Oct. 17, 1994

[30] Foreign Application Priority Data

Oct. 18, 1993 [JP] Japan .................................. 5-259547

[51] Int. Cl.$^6$ ...................................................... B32B 3/00
[52] U.S. Cl. ...................... 428/64.1; 428/64.2; 428/64.4; 428/64.5; 428/64.6; 428/64.7; 428/64.8; 428/913; 430/270.12; 430/270.13; 430/270.14; 430/495.1; 430/945; 369/275.5; 369/283; 369/288
[58] Field of Search ................. 428/64.1, 64.2, 428/64.4, 64.5, 64.6, 64.7, 64.8, 913; 430/270, 495, 945, 270.1, 270.11, 270.12, 270.13, 270.14; 369/275.5, 283, 288

[56] References Cited

U.S. PATENT DOCUMENTS

| | | | |
|---|---|---|---|
| 4,981,743 | 1/1991 | Ho | 428/64 |
| 5,344,682 | 9/1994 | Mizukuki | 428/64 |

FOREIGN PATENT DOCUMENTS

| | | |
|---|---|---|
| 0264037 | 4/1988 | European Pat. Off. . |
| 0574860 | 12/1993 | European Pat. Off. . |
| 0628956 | 12/1994 | European Pat. Off. . |
| 5-238005 | 9/1993 | Japan . |
| 6-31906 | 2/1994 | Japan . |
| 6-162568 | 6/1994 | Japan . |

OTHER PUBLICATIONS

Database WPI, Section Ch, Week 9336, Derwent Publications Ltd., London, GB; Class A89, An 93-283303 & JP-A-05198015 *Abstract*.

Database WPI, Section Ch, Week 8151, Derwent Publications Ltd., London, GB: Class A97, AN 81-93933D & JP-A-56143277 *Abstract*.

*Primary Examiner*—Patrick Ryan
*Assistant Examiner*—Elizabeth Evans
*Attorney, Agent, or Firm*—Burns, Doane, Swecker & Mathis

[57] ABSTRACT

An optical recording medium comprising a transparent substrate; a recording layer on the transparent substrate; a metal reflective layer; and one or more protective layers. These layers are laminated successively on the transparent substrate. The outermost protective layer is formed of an ultraviolet curable resin containing an organic filler and/or an inorganic filler having water absorbency and/or oil absorbency. The protective layer has a printable surface permitting writing characters with writing instruments or ink jet printers.

33 Claims, 1 Drawing Sheet

F/G.1

OPTICAL RECORDING MEDIUM

BACKGROUND OF THE INVENTION

1. Field of the Invention

The present invention relates to a medium, in particular to an optical recording medium, on which data can be written with, for example, writing implements, an ink-jet printer, or a sublimation printer.

2. Description of the Related Art

Sophisticated information society in recent years has created strong demands in recording media capable of high storage density, as an alternative to magnetic recording media. As such recording media, compact discs (CDs) and laser discs (LDs) are well known and are widely used. The CDs and LDs are optical read-only media produced by a pressing process. In this process, a plain glass disc known as a glass master is formed into a stamper. The stamper is equivalent to a photographic negative in the sense that it is a reverse of the final compact disc. This stamper is used to make a pressing on a transparent polymer, and the stamped surface is then plated with a reflective film or the like. A plastic coating is finally applied over the film to form an end product. This process permits cost-saving, mass production of media having the same information but is not suitable for a case where a small number of media is to be produced because the stamper is expensive. In this respect, methods to produce in a small scale user-recordable optical recording medium have been developed.

Optical recording medium can generally be classified into two groups: recordable media and erasable media. The former permits recording and reproduction of data while the latter permits erasure of recorded data. Of these, a recordable compact disc with a single substrate is called CD-R. The CD-R is compatible with common read-only CDs and has thus been used widely. The CD-R may be written upon by a user who bought an "empty" disc. Accordingly, it is necessary to provide an indicator for the recorded data so that the user can see what information is stored in the disc.

Users are familiar with a felt-tip with oil based ink to indicate the contents of the disc as a title. Hand-written titles are, however, not preferable for applications where the CD-Rs with data recorded therein are sold to end users. On the other hand, the CD-R may be labeled like a floppy disk with paper or plastic film on which well-designed characters and pictures are printed. However, a large donut-shaped label is required when the entire surface of the disc is to be labeled. It is difficult to position the label positively on the disc for labeling. In addition, the label may be stripped off and be caught by components in a disc player. In this respect other approaches have been desired.

For example, a hydrophilic surface layer may be provided on the side opposite to the light incident surface of the medium. Characters may be written directly on the hydrophilic surface with a pen with an oil-based or water-soluble ink, with a printer, particularly an ink-jet printer using inks containing a solvent. This approach is similar to the one used in commercially available OHP sheets for ink-jet printers. This OHP sheet has a surface coated with a resin containing hydrophilic polymers to fix water-soluble inks. In addition, organic or inorganic fillers are dispersed to form a fine irregular surface, thereby improving print characteristics.

The above mentioned method uses the hydrophilic polymer(s) dissolved in an organic solvent for coating. Accordingly, a drying step is required after application of the solution. This drying step with heat complicates the process and is thus not preferable because the CD-Rs are produced for a short tact time as in typical CDs. In addition, a large-scaled machine is required to reduce the tact time.

Further, the coating film is low in solvent resistance, especially water or alcohol, used for dissolving the hydrophilic polymer. The coating film may be damaged when the surface is wet with water accidentally. As a result, only insufficient properties could be obtained. The organic solvent, if used, may affect badly the working environment or may be a cause of air pollution. Accordingly, it should be avoided to remove the organic solvent through the drying step by environmental considerations. In this respect, there have been strong demands toward a method of forming a film with a solvent-free ultraviolet (UV) curable resin or the like.

However, the inks of the pen or the ink-jet printer may be repelled rather than be absorbed when a coating film of sufficient hardness is formed with a typical UV curable resin. As a result, various measures should be taken.

SUMMARY OF THE INVENTION

The present inventors have conducted substantial research to overcome the above mentioned problems and found a resin composition adapted to form a protective layer or a printing layer thereon when a resin layer protecting a recording layer and a metal reflective layer, or an anti-scratching layer covering the surface of the protective layer is provided. The present invention was thus completed.

More specifically, an optical recording medium according to the present invention comprises a transparent substrate, a recording layer on the transparent substrate, a metal reflective layer, and a protective layer. The optical recording medium further comprises (1) as a protective layer, or a printed layer laminated thereon, a resin layer obtained by means of adding to an UV curable resin an organic filler, an inorganic filler, or a mixture of organic and inorganic fillers mixed at any ratio, wherein the filler(s) is water absorbent and/or oil absorbent, and (2) the layer exposed to the air (the outermost layer) is formed of at least one hydrophilic polymer, at least one hydrophilic monomer, at least one cross-linking monomer, and at least one radical initiator.

In addition, the resins having the compositions (1) and (2) may be applied to other medium or substrate rather than the optical recording medium to permit writing and printing letters and characters with writing instruments or a printer.

BRIEF DESCRIPTION OF THE DRAWING

In FIG. 1, the reference numeral 1 represents a substrate, 2 represents a recording layer, 3 represents a metal reflective layer, 4 represents a protective layer and 5 represents a printable protective layer.

DESCRIPTION OF THE PREFERRED EMBODIMENT

Figure 1:
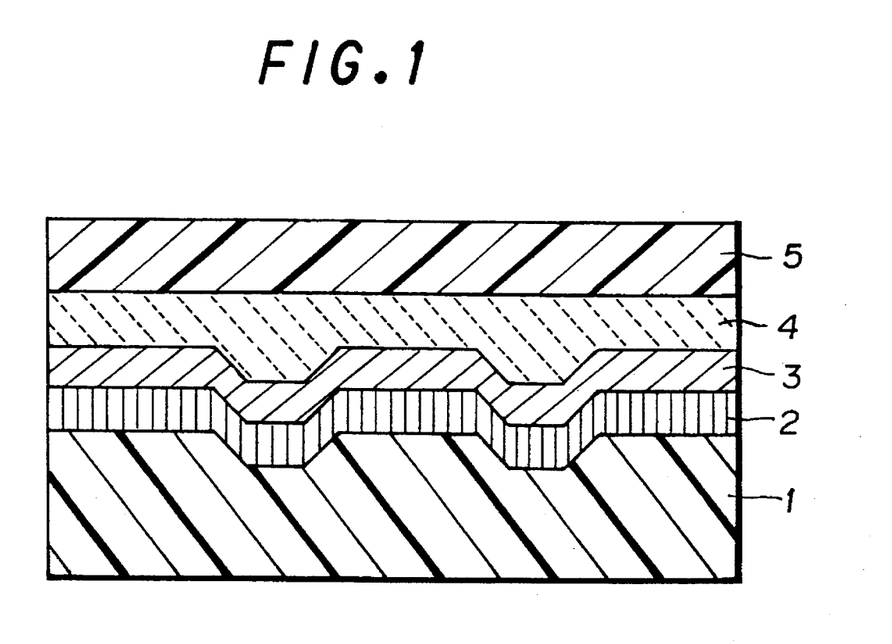
FIG. 1 is a sectional view illustrating an optical recording medium according to the present invention.

As shown in FIG. 1, the optical recording medium according to the present invention comprises a transparent substrate 1, a recording layer 2, a metal reflective layer 3, and a protective layer 4. For the purpose of improving properties and characteristics of the medium, other layer(s) may be laminated such as a base layer or a printed layer.

The substrate used in the present invention may be any one of transparent materials to allow recording and reproduction by light. Examples of the transparent material include polymer materials such as polycarbonate resins, acrylic resins, polystyrene resins, vinyl chlorides, epoxy resins, polyester resins, amorphous polyolefin; and inorganic materials such as glass. In particular, it is preferable to use a material having a high light transmittance and a low optical anisotropy such as the polycarbonate resins.

The surface of the substrate may have pits, tracking guides indicative of a recording position, or pits for information to be only reproduced. These guides or bits are typically formed in producing the substrate by means of injection molding or casting. Alternatively, the pits and guides may be formed through laser cutting or a photopolymer method.

The recording layer used in the present invention is required to be recorded via laser beams. The recording layer is formed of inorganic and organic substances. An inorganic recording layer contains rare earth transition metal alloys such as Tb.Fe.Co and Dy.Fe.Co for recording by photothermal magnetic effects. In addition, the inorganic recording layer may contain a chalocogens alloy such as Ge.Te, and Ge.Sb.Te for recording by phase transition.

For the organic substances, organic dyes are typically used. The dye used may be a mixture of two or more dyes. In addition, additives other than a photo absorbent substance may be added.

Specific examples of the dye used in the recording medium include macrocyclic azaannulene dyes (e.g., phthalocyanine dyes, naphthalocyanine dyes, and porphyrin dyes); polymethine dyes (e.g., cyanine dyes, merocyanine dyes, and squarylium dyes); anthraquinone dyes; azulenium dyes; azo dyes; and indoaniline dyes. Of these, phthalocyanine dyes are particularly preferable because of their high durability and light resistance.

The recording layer containing the above mentioned dye(s) may be formed by means of any one of typical coating methods such as spin coating, spray coating, dip coating, and roll coating. In this event, dyes and other substances forming the recording layer are dissolved in a solvent and applied to the substrate before being dried. This solvent is required to be damage free to the substrate. The solvent used may be, for example, polar solvents including aliphatic and alicyclic hydrocarbons such as hexane, heptane, octane, decane, and cyclohexane; aromatic hydrocarbons such as toluene and xylene, ethers such as diethyl ether and dibutyl ether; alcohols such as methanol, ethanol, isopropyl alcohol, and methyl cellosolve; and halogenated hydrocarbons such as 1,2-dichloroethane, and chloroform. These solvents may be used alone or mixed with each other.

The recording layer may be formed by using a vacuum deposition technique. This method can be used advantageously when the substances for the recording layer have low or no solubility to the solvent or when no damage-free solvent can be selected for a given substrate.

Various base layers may be provided between the recording layer and the substrate to avoid deterioration of the recording layer. For example, an applicable layer may be the one containing organic substances such as polystyrene and polymethylmethacrylate and inorganic substances such as $SiO_2$. These substances may be used alone or mixed together. In addition, two or more different base layers may be laminated.

A metal reflective layer is laminated on the above mentioned recording layer. The metal reflective layer contains metals such as Au, Al, Pt, Ag, and Ni, or alloys thereof. It is particularly preferable to use gold because gold is chemically unreactive and is unaffected by oxygen and water. The reflective layer may be formed by means of vapor deposition, sputtering, or ion plating.

An intermediate layer may be provided between the metal reflective layer and the recording layer to improve reflectivity or adhesion between the layers.

A protective layer is laminated on the reflective layer.

The protective layer may be formed of resins such as those polymerized through radical polymerization. Examples of such resins include acrylic resins and methacrylate resins. Alternatively, epoxy resins may also be used that are subjected to cationic polymerization with light. These resins may be polymerized alone. Alternatively, the resin may be copolymerized with other monomers or oligomers. In addition, the resin may be diluted with a solvent for application. Of these, it is preferable to use an ultraviolet curable resin in view of workability considerations. The protective layer may be formed by means of spin coating, dip coating, bar coating, or screen printing. The spin coating is typically used in view of good workability considerations. The layer may be from 1 μm to 100 μm thick. However, it is preferable that the film thickness is in a range from 1 to 20 μm.

The recording and reflective layers are protected by the so formed protective layer. A stronger protective layer may be further required depending on the conditions. In such a case, it is possible to use organic substances such as the ultraviolet curable resins, thermoset resins, and solvent-containing polymers, or inorganic substances such as $SiO_2$. These may be used alone or mixed together. Two or more films may be laminated to improve the adhesion to other layer or layers.

After information is recorded in the medium, for convenience sake the contents thereof is written on the surface of the medium. However, the oil-based or water-soluble ink is repelled when directly writing on the surface coated with the conventional protective layer. In addition, when the inks that contain dyes and pigments in the solvent such as those used in the ink-jet printers are used, characters printed with these inks may run or be repelled. In the present invention, the resin forming the outermost protective layer or printed layer thereon contains an organic filler, an inorganic filler, or a mixture of organic and inorganic fillers having water absorbency and/or oil absorbency. These fillers absorb the solvent or water of the ink of a pen or a printer, so that drying time is reduced. For the conventional UV curable inks obtained by means of mixing the UV curable resin composition and the filler, the fillers are added in order to form irregularity on the coating surface, to control and adjust the viscosity, to improve strength of the coating film, or to adjust color tones. Accordingly, such fillers are not water absorbent and/or oil absorbent. In the present invention, the water absorbent and/or oil absorbent fillers readily absorb and fix the inks printed on the surface of the resin layer.

Specific examples of the organic fillers include acrylic resins; polyacrylic esters; polymethacrylic esters; styrene resins; polyesters; polycarbonates, fine particles of modified melamine resins; fine particles of polyvinylalcohol, polyacrylamide, polyvinylpyrrolidone, or rubbers; cross-linked fine particles of these polymers; and powders of lignin, protein, and cellulose.

To avoid repelling oil-based or water-soluble ink, the filler is required to have a high water absorbency or oil absorbency. In this respect, powders of lignin, protein, or cellulose are preferable and can be used advantageously when the ink contains a solvent which does not dry easily.

Specific examples of the inorganic fillers include silica, talc, clay, calcium carbonate, calcium silicate, barium sulfate, mica, diatomaceous earth silica, aluminum hydroxide, alumina, zirconium oxide, and zirconium hydroxide. Only insufficient effects can be obtained with ground silica fillers because of their low water and oil absorbency. However, synthetic silica fillers comprised of secondary particles formed of coagulation of fine primary particles have voids or gaps therein and permit the solvent of the oil-based or water-soluble ink to enter the voids or gaps in the fillers. Accordingly, such silica having good absorbency can be used advantageously.

For many of the inorganic fillers, the oil absorbency is available in publications. The oil absorbency is typically indicated by the amount of linseed oil absorbed by 100 g of filler pursuant to JIS K 5101. In the present invention, it is preferable that the oil absorbency is 5 ml/100 g (filler amount) or higher, and more preferably it is 15 ml/100 g or higher.

There is no standard measuring method for water absorbency. However, it is preferable that a water droplet is readily soaked with the filler. With fillers having a fluoro-treated surface, the water droplet becomes spherical rather than being absorbed by the filler. With such filler, the ink is repelled and is not dried regardless of whether it is oil-based or water soluble.

The organic and inorganic fillers may be used alone. However, these fillers may be used together to improve the drying property, to control and adjust the ink viscosity, and to improve the color tone. In this event, a mixing ratio may be varied depending on applications.

A filler such as an aerosil having a viscosity thickening property may be added to control and adjust the viscosity of the ink. Other additives may be used depending on applications. Examples of the additives include leveling agents, anti-foaming agents, de-foaming agents, thickeners, anti-trickling agents, anti-precipitants, pigment dispersing additives, wetting agents, and dispersants.

The resin used is a UV curable resin. In this invention, to use a solvent for dilution is not preferable because a drying step is required before curing, which complicates the entire process. In addition, the organic solvent evaporated in drying is not preferable in view of environmental considerations. The UV curable resin is used typically without a solvent. The filler(s), if added to the UV curable resin, should be used in a limited amount since addition of the filler increases the viscosity of the resultant resin. Such increase of the viscosity badly affects the drying time of the ink with less portion of ink absorbed, which is not preferable for the present invention. It is preferable to reform the resin composition to improve the properties of the resin layer. More specifically, this resin layer is formed of the UV curable resin composition containing at least one hydrophilic polymer, at least one hydrophilic monomer, at least one cross-linking monomer, and a radical initiator.

By means of adding the hydrophilic polymer to the outermost layer, it becomes easier to fix the ink printed on the surface. The hydrophilic polymer may be, for example, homopolymers and copolymers of polyvinylalcohol, hydroxyethyl cellulose, hydroxypropyl cellulose, polyacrylamide, polyvinylpyrrolidone, and polyethylene oxide. For copolymers, it may be a copolymer with a compound other than the hydrophilic polymer. These polymers may be used alone or mixed together. The more the hydrophilic polymer is added, the better the ink is fixed. However, an excessively large amount of polymer may increase the viscosity of the resin so as to fail to form a film or may separate a polymer portion. Accordingly, it is preferable that the total amount of the hydrophilic polymer is in a range from 1 to 80 parts by weight, and more preferably from 10 to 70 parts by weight, based on the resin composition.

In the present invention, the hydrophilic polymer is dissolved in a polar hydrophilic monomer for usage. Specific examples of the hydrophilic monomer include those of high polarity such as hydroxyethylacrylate, hydroxyethylmethacrylate, hydroxypropylacrylate, hydroxypropylmethacrylate, hydroxybutylacrylate, hydroxybutylmethacrylate, hydroxypentylacrylate, hydroxypentylmethacrylate, phenoxyhydroxypropylacrylate, phenoxyhydroxypropylmethacrylate, chlorohydroxypropylacrylate, chlorohydroxypropylmethacrylate, diethyleneglycol monoacrylate, diethyleneglycol monomethacrylate, triethyleneglycol monoacrylate, triethyleneglycol monomethacrylate, polyethyleneglycol monoacrylate, polyethyleneglycol monomethacrylate, dipropyleneglycol monoacrylate, dipropyleneglycol monomethacrylate, polypropyleneglycol monoacrylate, polypropyleneglycol monomethacrylate, glycerin monoacrylate, glycerin monomethacrylate, glycerin diacrylate, glycerin dimethacrylate, pentaerithritol triacrylate, pentaerithritol trimethacrylate, phenylglycidylether acrylate, phenylglycidylether methacrylate, dipentaerithritol pentaacrylate, dipentaerithritol pentamethacrylate, those having an OH group in a molecule such as diacrylate or dimethacrylate of bisphenol A epoxy resin, dimethylacryamide, dimethylmethacrylamide, diethylacrylamide, diethylmethacrylamide, acryloyl morpholine, N-vinylpyrrolidone, 2-ethoxyethylacrylate, 2-ethoxyethylmethacrylate, 2-methoxyethylacrylate, 2-methoxyethylmethacrylate, ethylcarbitol acrylate, ethyl carbitol methacrylate, glycidylacrylate, and glycidyl methacrylate. The monomer may be a monofunctional, di- or polyfunctional monomer. These monomers dissolve the hydrophilic polymer uniformly as a solvent. In addition, the monomer inhibits repelling and running of the ink when characters are written on the surface of the resin layer with a pen or an ink-jet printer containing an ink having a large amount of an organic solvent or water. In particular, the hydrophilic polymer may be dissolved more readily in a monomer having a group of high polarity such as a hydroxyl group, a carboxyl group, and an amino group in a molecule. To improve solubility of the hydrophilic polymer, a solvent may partially be used such as water; alcohols such as methanol, ethanol, propanol, butanol, pentanol, and hexanol; ethers such as dimethylether, diethylether, methylethylether, and dipropylether; ketones such as acetone and cyclohexane; and halogen-based solvents such as dichloroethane and chloroform. The total amount of the hydrophilic monomer is in the range of from 20 to 98 parts by weight, and preferably from 50 to 90 parts by weight based on the resin composition.

A cross-linking monomer is added thereto. Specific examples of the cross-linking monomer include trimethylpropanetriacrylate, trimethylpropanetrimethacrylate, acrylic isocyanurate, 1,4-butanedioldiacrylate, 1,4-butanedioldimethacrylate, 1,6-hexanedioldiacrylate, 1,6-hexanedioldimethacrylate, neopentylglycol diacrylate, neopentylglycol dimethacrylate, dicyclopentadienyldiacrylate, dicyclopentadienyldimethacrylate, pentaerythritol tetraacrylate, and pentaerythritol tetramethacrylate. The cross-linking monomer may not be always added when the above mentioned hydrophilic monomer is multifunctional such as glycerin diacrylate, glycerin dimethacrylate, pentaerythritol triacrylate, pentaerythritol trimethacrylate, dipentaerythritol hexaacrylate, and dipentaerythritol hexamethacrylate. By means of adding the cross-linking polymer, a cross-linking density of the outermost protective layer is increased, which in turn increases the hardness of the coating film. The total amount of the cross-linking monomer is in the range of from 0 to 40 parts by weight, and preferably from 1 to 20 parts by weight based on the resin composition.

The viscosity may be increased when the hydrophilic polymer is added to the mixture of the UV curable hydrophilic monomer(s) and/or the cross-linking monomer(s). Addition of the filler(s) to the mixture further increases the viscosity. With a monomer of unnecessarily high viscosity being used, the viscosity is increased further after addition of the filler. As a result, it becomes difficult to apply. In the present invention, the UV curable resin is preferably as low as possible in viscosity.

A radical initiator is used therefor. Specific examples of the radical initiator include acetophenone based initiators such as 1-hydroxycyclohexylphenylketone, 2-hydroxy-2-methyl-1-phenylpropane-1-one, 2,2-diethoxyacetophenone, and 4'-phenoxy-2,2-dichloroacetophenone; propiophenone based initiators such as 2-hydroxy-2-methylpropiophenone; anthraquinone based initiators such as 2-chloroanthraquinone; and thioxanthone based initiators such as 2,4-diethylthioxanthone. The amount of the initiator added is in a range from 0.1 to 10 parts by weight, and preferably from 1 to 8 parts by weight based on the resin composition. The radical initiators may be used alone or mixed together.

The filler is added in an amount of from 1 to 80 parts by weight, and preferably from 5 to 50 parts by weight, relative to 100 parts of the resin. Considering preservative stability, it is preferable to stir them uniformly by using, for example, a disper type mixer. Excessive mixing with a roll-mill breaks and disperses the secondary particles of the synthetic silica fillers into fine primary particles, so that their absorbing properties cannot be fully exhibited. The organic filler such as protein or cellulose composed of natural materials may be crushed when excessive mixing is applied, thereby deteriorating the water absorbency or oil absorbency.

The outermost layer may be formed through bar coating, blade coating, air knife coating, roll coating, or screen printing. Of these, screen printing is particularly preferable to form irregularities on the surface, thereby improving the writability or printability. In the present invention, a solvent may be added to the UV curable resin to improve coatability of the resin upon forming the layer, as long as substantially no drying step is required. The film thickness may be in the range of from 1 to 100 μpm. However, it is preferable that the film thickness is in the range of from 1 to 20 μm considering any possible effects to deformation of the disc. If at least one protective layer is formed on the entire surface of the reflective layer, the film may be over the entire surface or a part of the surface of the disc.

The UV curable resin coated is cured with UV light. Upon curing the resin with the UV light, an energy of 150 to 2000 mJ/cm$^2$, preferably from 250 to 1000 mJ/cm$^2$ is applied to the resin. In this event, the coated film is cured within a few seconds.

When a thermoset or thermodry resin is used with a solvent, it takes about several minutes to heat and cure the resin. It is preferable to use the UV curable resin to avoid many disadvantages such that the coating film may be non-uniform when the medium is inclined or stacked, that the substrate may be corroded by the solvent, that the resin may be adhered to other portions or components and that the uneven surface is formed after drying.

In addition, the monomer is polymerized to form cross-linking in the UV curable resin. Unlike the conventional method of dissolving the polymer with a solvent and then applying and drying it, the present hydrophilic polymer added is stable without separating out in a moisture resistance test. The UV curable resin of the present invention is thus free from deterioration of the printing properties and is less likely to give a sticking surface under a humid condition.

An ultraviolet lamp used for curing may be a mercury vapor lamp, a high pressure mercury vapor lamp, a super high pressure mercury vapor lamp, or a metal halide lamp. It is preferable to use a high pressure mercury vapor lamp, or a metal halide lamp for its generating power and cost.

To write or print characters on the so formed outermost protective layer, a pen or a stamp with an oil-based ink, or with a water-soluble ink may be used. In addition, an ink jet printer, a sublimation printer, or a thermal transfer printer may be used with the oil-based or water-based ink.

Other layer or layers may be laminated partially on a portion other than the portion for writing or printing. For example, a common company name or trade mark, a trade name, or an indication of the software therein may be indicated in the portion other than where is available for titles, numbers, or dates different from medium to medium. In this event, two or more layers may be laminated further by using screen printing or offset printing.

The ink comprising the filler and the UV curable resin composition forming the outermost protective resin layer is used for the optical recording media having the recording layer as the UV curable ink suitable for forming the printable protective layer on the surface of the disc. Besides, the ink may be applied to the surface of other materials or articles. For example, the ink may be applied to a casing surface of magneto-optical discs, mini discs, floppy discs, and cassette tapes, a blank for writing letters in magnetic cards or optical cards, various plastics, paper, and metals.

According to the recording medium of the present invention, printing ink is not repelled and does not run and can be used advantageously to write characters on the surface of the medium with writing implements. In addition, good workability and short tack time can be provided because the UV curable resin is used.

The present invention is described more in detail in conjunction with the following examples and comparative examples. However, it should be understood that the present invention is not limited to those specific examples.

EXAMPLE 1

0.5 g of phthalocyanine dye was dissolved in 10 ml of n-octane to prepare a coating solution. This solution was spin coated on a polycarbonate substrate (120 mm in diameter, 1.2 mm in thickness) obtained by injection molding with a track pitch of 1.6 μm and a spiral groove of 0.6 μm in width and 0.1 μm in depth. The solution was coated at a rotation speed of 1500 rpm to form a recording layer. Subsequently, a gold reflective layer of 60 nm thick was formed over the recording layer through sputtering. An ultraviolet curable resin SD-17 (A product of Dai Nippon Ink Chemicals, Co., Ltd.) was spin coated on this reflective layer, to which ultraviolet light was irradiated to cure the resin so as to form a protective layer of 3 μm. An organic filler composed mainly of protein (average particle diameter of 10 μm) was added to the resin having a composition of 20 parts by weight of bisphenol A epoxyacrylate, 10 parts by weight of dipentaerythritol hexaacrylate, 65 parts by weight of N-vinyl-2-pyrrolidone, and 5 parts by weight of radical initiator Darocure 1173 (2-hydroxy-2-methyl-1-phenolpropane-1-one, in the amount of 10 parts by weight relative to 100 parts by weight of the resin. The mixture was mixed with a disper, and was printed to 5 cm in length, 3 cm in width, and 20 μm in film thickness. Subsequently, the resin was exposed to UV light by using an ultraviolet irradiation device adjusted with two lamps of 80 W while moving the resin at 5 m/min. As a result, curing was completed in a few seconds.

Characters were written on the printable surface with the oil-based or water-soluble ink of pens. As a result, the ink was not repelled. In addition, characters were directly printed on this resin layer with an ink jet printer without running.

EXAMPLE 2

Example 1 was repeated to form a recording layer and a reflective layer. Subsequently, a synthetic silica TOKUSIL GU (A product of Tokuyama Corporation; primary particle diameter of 18–40 nm; secondary particle diameter of about 20 μm) was mixed, in an amount of 20 parts by weight relative to 100 parts by weight of the resin, with a resin containing 40 parts by weight of urethane acrylate oligomer, 30 parts by weight of trimethylolpropanetriacrylate, 25 parts by weight of vinyl pyrrolidone, and 8 parts by weight of radical initiator Irugacure 184 (α-hydroxy-alkylphenol). The mixture was mixed by using a disper, and was printed through screen printing into a donut shape of 30 μm in thickness and from 18 mm to 11.9 mm in radius, entirely covering the reflective layer. Subsequently, the resin was exposed to UV light by using an ultraviolet irradiation device adjusted with two lamps of 80 W while moving the resin at 5 m/min.

Characters were written on the printable surface with the oil-based or water-soluble ink of pens. As a result, the ink was not repelled.

EXAMPLE 3

Example 1 was repeated to form a recording layer and a reflective layer, on which an ultraviolet curable resin SD-17 (A product of Dai Nippon Ink Chemicals, Co., Ltd.) was spin coated. The ultraviolet curable resin was then subjected to UV light and cured into a protective layer of 3 μm thick. Subsequently, 5 parts by weight of pulverized cellulose (average particle diameter of 15 μm) and 20 parts by weight of a white carbon TOKUSIL GU, relative to 100 parts by weight of the resin, were mixed by using a disper with the resin containing 10 parts by weight of urethane acrylate oligomer, 60 parts by weight of hydroxyethylacrylate, 25 parts by weight of 1,4-butanedioldiacrylate, and 5 parts by weight of radical initiator Darocure 1173. The mixture was printed through screen printing into concentric donut shape of 119 mm and 40 mm in diameter. Subsequently, the resin was exposed to the UV light by using an ultraviolet irradiation device adjusted with two lamps of 80 W while moving the resin at 5 m/min.

Characters were written on the printable surface with the oil-based or water-soluble ink of pens. As a result, the ink was not repelled.

EXAMPLE 4

Example 1 was repeated to form a recording layer and a reflective layer, on which an ultraviolet curable resin SD-17 (A product of Dai Nippon Ink Chemicals, Co., Ltd.) was spin coated. The ultraviolet curable resin was then subjected to UV light and cured into a protective layer of 3 μm thick. Subsequently, 40 parts by weight of a synthetic silica TOKUSIL GU, relative to 100 parts by weight of the resin, was mixed by using a disper with the resin containing 10 parts by weight of polyvinylpyrrolidone-vinylacetate copolymer (7:3; 50% ethanol solution available from Tokyo Kasei Co., Ltd.), 80 parts by weight of acryloyl morpholine, 5 parts by weight of trimethylolpropanetriacrylate, and 5 parts by weight of radical initiator Darocure 1173. The mixture was printed through screen printing into concentric donut shape of 119 mm and 40 mm in diameter. Subsequently, the resin was exposed to UV light by using an ultraviolet irradiation device adjusted with two lamps of 80 W while moving the resin at 5 m/min.

Characters were written on the printable surface with the oil-based or water-soluble ink of pens. As a result, the ink was not repelled.

EXAMPLE 5

Example 1 was repeated to form a recording layer and a reflective layer, on which an ultraviolet curable resin SD-17 (A product of Dai Nippon Ink Chemicals, Co., Ltd.) was spin coated. The ultraviolet curable resin was then subjected to UV light and cured into a protective layer of 3 μm thick. 15 parts by weight of polyacrylamide, 62 parts by weight of hydroxypropylacrylate, 10 parts of neopentylglycol diacrylate, 5 parts by weight of dipentaerithritol hexaacrylate, and 5 parts by weight of radical initiator Darocure 4265 (1:1 mixture of Darocure 1173 and 2,4,6-trimethylbenzoyldiphenyl-phosphine oxide) were mixed. To this resin, 15 parts by weight of protein filler, 5 parts by weight of synthetic silica TOKUSIL GU, and 3 parts by weight of aerosil for viscosity adjustment were mixed well by using a disper. The mixture was printed through screen printing into concentric donut shape of 119 mm and 40 mm in diameter. Subsequently, the resin was exposed to UV light by using an ultraviolet irradiation device adjusted with two lamps of 80 W while moving the resin at 5 m/min.

Characters were written on the printable surface with the oil-based or water-soluble ink of pens. As a result, the ink was not repelled.

COMPARATIVE EXAMPLE 1

Example 1 was repeated to form the recording layer and the reflective layer, on which an ultraviolet curable resin SD-17 containing no filler was spin coated and cured with UV light. Subsequently, characters were written on the ultraviolet curable resin surface with the oil-based or water-soluble ink of commercially available pens. As a result, some of the oil-based inks were repelled to make the characters illegible, and the water-soluble ink was not laid on the surface.

COMPARATIVE EXAMPLE 2

Example 1 was repeated to form the recording layer and the reflective layer, on which an ultraviolet curable resin SD-17 was spin coated and cured with UV light. On the cured resin a commercially available CD screen printing ultraviolet curable ink (Dai Nippon Ink Chemicals Co., Ltd.) containing pigments was printed into 5 cm in length, 3 cm in width, and 20 μm in thickness. This was exposed to UV light by using an ultraviolet irradiation device adjusted with two lamps of 80 W while moving the resin at 5 m/min. Subsequently, characters were written on the ultraviolet curable resin surface with the oil-based or water-soluble ink of commercially available pens. As a result, some of the oil-based inks were repelled, and the water-soluble ink was not laid on the surface.

COMPARATIVE EXAMPLE 3

Example 1 was repeated to form the recording layer and the reflective layer, on which an ultraviolet curable resin SD-17 was spin coated and cured with UV light. 20 parts by weight of mechanically ground silica (average particle diameter of 5 μm) having no water absorbency nor oil absorbency was added to 100 parts by weight of the resin containing 10 parts by weight of urethane acrylate oligomer, 60 parts by weight of hydroxyethylacrylate, 25 parts by weight of 1,4-butanedioldiacrylate, and 5 parts by weight of radical initiator Darocure 1173. The mixture was printed through screen printing into concentric donut shape of 119 mm and 40 mm in diameter. Subsequently, the resin was exposed to the UV light by using an ultraviolet irradiation device adjusted with two lamps of 80 W while moving the resin at 5 m/min. Characters were successfully written on the surface with oil-based ink of a commercially available pen. However, a pen and an ink jet printer with water-soluble ink were not useful to write characters, i.e., the solvent and water did not dry and the ink was repelled.

COMPARATIVE EXAMPLE 4

Example 1 was repeated to form the recording layer and the reflective layer, on which an ultraviolet curable resin SD-17 was spin coated and cured with UV light. 10 parts by weight of polyvinyl alcohol and 10 parts by weight of polyvinyl pyrrolidone were dissolved well in ethanol, to which 5 parts by weight of synthetic silica TOKUSIL GU was added.

The mixture was printed through screen printing into concentric donut shape of 119 mm and 40 mm in diameter, which required to be dried at 60° C. for 1 hour by using a blower to obtain a tack-free surface.

Pens with oil-based ink and water-soluble ink, as well as an ink jet printer effected to write characters on the resultant surface. However, a part of the coating film was dissolved by water when subjected to a moisture resistance test at 80° C. and 85% RH for 100 hours and resulted in a non-uniform film.

For Examples and Comparative Examples, the results of the printing test and the humidity resistance test are given in Table 1 below. The humidity resistance test was performed as follows:

the optical recording media formed were stood in a thermo-hygrostat at 80° C., 85% relative humidity for 100 hours.

TABLE 1

| | Pen with Oil-based Ink 1 | Pen with Oil-based Ink 2 | Pen with Water-soluble Ink 1 | Pen with Water-soluble Ink 2 | Ink-jet Printer | Humidity/Heat Resistance Test (80° C. 85% RH 100 h) | |
|---|---|---|---|---|---|---|---|
| | | | | | | Before Print | After Print |
| Example 1 | o | o | o | o | o | o | o |
| Example 2 | o | o | o | o | o | o | |
| Example 3 | o | o | o | o | o | o | o |
| Example 4 | o | o | o | o | o | o | o |
| Example 5 | o | o | o | o | o | o | o |
| Comparative Example 1 | Δ | o | x | x | x | x | x |
| Comparative Example 2 | x | Δ | x | x | x | x | x |
| Comparative Example 3 | o | o | Δ | x | x | x | x |
| Comparative Example 4 | o | o | o | o | o | x | x |

1. Printing test with pens and an ink jet printer.
Oil-based 1: Mitsubishi marker A-5
Oil-based 2: Pentel felt-tip
Water-soluble 1: Pilot DRAWING PEN
Water-soluble 2: ZEBRA fluorescent pen
Ink jet printer: Canon bubble jet printer
Results o: Complete writing without ink repelling
Δ: Part of written portion repelled
x: Completely repelled to make characters illegible, ink not dried
2. Moisture Resistance Test: 80° C., 85% RH, 100 hours
Results o: No ink flowing trickling
Δ: Ink running to make characters illegible
x: A portion of coating film dissolved and separated

What is claimed is:

1. An optical recording medium comprising:

a transparent substrate;

a recording layer on the transparent substrate;

a metal reflective layer; and at least one protective layer having a thickness of 1 to 100 μm;

these layers being laminated successively on the transparent substrate, the outermost protective layer being formed of an ultraviolet curable resin containing an organic filler and/or an inorganic filler having water absorbency and/or oil absorbency, said filler being present in an amount of from 1 to 80 parts by weight so that the protective layer has a printable surface.

2. An optical recording medium as claimed in claim 1, wherein the outermost protective layer formed of the ultraviolet curable resin is formed by means of curing with an ultraviolet radiation an ink obtained as a mixture of a filler and an ultraviolet curable resin composition comprising:

a) from 1 to 80 parts by weight of hydrophilic polymer;

b) from 20 to 98 parts by weight of hydrophilic monomer;

c) from 0 to 40 parts by weight of cross-linking monomer; and d) from 0.1 to 10 parts by weight of radical initiator.

3. An optical recording medium as claimed in claim 2, wherein the outermost protective layer formed of the ultraviolet curable resin is formed by means of curing with an ultraviolet radiation an ink obtained as a mixture of a filler and an ultraviolet curable composition resin comprising:

a) from 10 to 70 parts by weight of hydrophilic polymer;

b) from 50 to 90 parts by weight of hydrophilic monomer;

c) from 1 to 20 parts weight of cross-linking monomer;

d) from 1 to 8 parts by weight of radical initiator.

4. An optical recording medium as claimed in claim 1, wherein the organic filler contained in the outermost protective layer formed of the ultraviolet curable resin is at least one selected from the group consisting of lignin, protein, and cellulose.

5. An optical recording medium as claimed in claim 1, wherein the inorganic filler contained in the outermost protective layer formed of the ultraviolet curable resin comprises at least one selected from the group consisting of synthetic silica, talc, clay, calcium carbonate, calcium silicate, barium sulfate, mica, diatomaceous earth silica, aluminum hydroxide, alumina, zirconium oxide, and zirconium hydroxide.

6. An optical recording medium as claimed in claim 1 wherein the outermost protective layer formed of the ultraviolet curable resin comprises the ultraviolet curable resin and the organic filler and/or the inorganic filler in an amount ranging from 1 to 80 parts by weight relative to 100 parts by weight of the ultraviolet curable resin.

7. An optical recording medium as claimed in claim 6 wherein the outermost protective layer formed of the ultraviolet curable resin comprises the ultraviolet curable resin and the organic filler and/or the inorganic filler in an amount ranging from 5 to 50 parts by weight relative to 100 parts by weight of the ultraviolet curable resin.

8. An optical recording medium as claimed in claim 1, wherein the outermost protective layer formed of the ultraviolet curable resin is coated through screen printing, bar coating, blade coating, air knife coating, or roll coating.

9. An optical recording medium as claimed in claim 1, wherein the outermost protective layer formed of the ultraviolet curable resin is formed by curing with irradiation of ultraviolet light after application of the ink obtained by mixing the filler with the ultraviolet curable composition.

10. A method for printing on the surface of an optical recording medium comprising the steps of:

printing and fixing characters with an ink on the surface of the outermost protective layer formed of the ultraviolet curable resin of the optical recording medium of claim 1.

11. An optical recording medium as claimed in claim 1 comprising:

a transparent substrate;

a recording layer on the transparent substrate;

a metal reflective layer; and at least one protective layer;

these layers being laminated successively on the transparent substrate, the outermost protective layer being formed of an ultraviolet curable resin containing an organic filler having water absorbency and/or oil absorbency.

12. An optical recording medium as claimed in claim 11, wherein the organic filler contained in the outermost protective layer formed of the ultraviolet curable resin is at least one selected from the group consisting of lignin, protein, and cellulose.

13. An optical recording medium as claimed in claim 1, wherein the outermost protective layer formed of the ultraviolet curable resin is formed by means of curing with ultraviolet radiation an ink obtained as a mixture of a filler and an ultraviolet curable resin composition comprising:

a) from 1 to 80 parts by weight of hydrophilic polymer;

b) from 20 to 98 parts by weight of hydrophilic monomer;

c) from 0 to 40 parts by weight of cross-linking monomer; and d) from 0.1 to 10 parts by weight of radical initiator.

14. An optical recording medium as claimed in claim 13, wherein the organic filler contained in the outermost protective layer formed of the ultraviolet curable resin is at least one selected from the group consisting of lignin, protein, and cellulose.

15. An optical recording medium as claimed in claim 13, wherein the inorganic filler contained in the outermost protective layer formed of the ultraviolet curable resin comprises at least one selected from the group consisting of synthetic silica, talc, clay, calcium carbonate, calcium silicate, barium sulfate, mica, diatomaceous earth silica, aluminum hydroxide, alumina, zirconium oxide, and zirconium hydroxide.

16. An optical recording medium as claimed in claim 13, wherein the outermost protective layer formed of the ultraviolet curable resin is formed by means of curing with ultraviolet radiation an ink obtained as a mixture of a filler and an ultraviolet curable composition resin comprising:

a) from 10 to 70 parts by weight of hydrophilic polymer;

b) from 50 to 90 parts by weight of hydrophilic monomer;

c) from 1 to 20 parts by weight of cross-linking monomer; and d) from 1 to 8 parts by weight of radical initiator.

17. An optical recording medium as claimed in claim 16, wherein the organic filler contained in the outermost protective layer formed of the ultraviolet curable resin is at least one selected from the group consisting of lignin, protein, and cellulose.

18. An ultraviolet curable ink suitable for forming a printable protective layer comprising an ultraviolet curable resin composition as claimed in claim 16 and an organic filler and/or an inorganic filler having water absorbency and/or oil absorbency.

19. An ultraviolet curable ink as claimed in claim 18 for forming a printable protective layer comprising the ultraviolet curable resin composition and from 1 to 80 parts by weight in total of the organic filler and/or the inorganic filler having water absorbency and/or oil absorbency relative to 100 parts by weight of the ultraviolet curable resin composition.

20. An ultraviolet curable ink as claimed in claim 19 suitable for forming a printable protective layer comprising the ultraviolet curable resin composition and from 5 to 50 parts by weight in total of the organic filler and/or the inorganic filler having water absorbency and/or oil absorbency relative to 100 parts by weight of the ultraviolet curable composition.

21. An ultraviolet curable ink suitable for forming a printable protective layer comprising an ultraviolet curable resin composition as claimed in claim 18 and an organic filler and/or an inorganic filler having water absorbency and/or oil absorbency.

22. An ultraviolet curable ink as claimed in claim 21 for forming a printable protective layer comprising the ultraviolet curable resin composition and from 1 to 80 parts by weight in total of the organic filler and/or the inorganic filler having water absorbency and/or oil absorbency relative to 100 parts by weight of the ultraviolet curable resin composition.

23. An ultraviolet curable ink as claimed in claim 22 suitable for forming a printable protective layer comprising the ultraviolet curable resin composition and from 5 to 50 parts by weight in total of the organic filler and/or the inorganic filler having water absorbency and/or oil absorbency relative to 100 parts by weight of the ultraviolet curable composition.

24. An optical recording medium as claimed in claim 16 wherein the inorganic filler contained in the outermost protective layer formed of the ultraviolet curable resin comprises at least one selected from the group consisting of synthetic silica, talc, clay, calcium carbonate, calcium silicate, barium sulfate, mica, diatomaceous earth silica, aluminum hydroxide, alumina, zirconium oxide, and zirconium hydroxide.

25. An optical recording medium as claimed in claim 24 wherein the outermost protective layer formed of the ultraviolet curable resin comprises the ultraviolet curable resin and the organic filler and/or the inorganic filler in an amount ranging from 1 to 80 parts by weight relative to 100 parts by weight of the ultraviolet curable resin.

26. An optical recording medium as claimed in claim 25 wherein the outermost protective layer formed of the ultraviolet curable resin comprises the ultraviolet curable resin and the organic filler and/or the inorganic filler in an amount ranging from 5 to 50 parts by weight relative to 100 parts by weight of the ultraviolet curable resin.

27. An optical recording medium as claimed in claim 26, wherein the outermost protective layer formed of the ultraviolet curable resin is coated through screen printing, bar coating, blade coating, air knife coating, or roll coating.

28. An optical recording medium as claimed in claim 27, wherein the outermost protective layer formed of the ultraviolet curable resin is formed by curing with irradiation of ultraviolet light after application of the ink obtained by mixing the filler with the ultraviolet curable composition.

29. A method for printing on the surface of an optical recording medium comprising the steps of:

printing and fixing characters with an ink on the surface of the outermost protective layer formed of the ultraviolet curable resin of the optical recording medium of claim 27.

30. A printing method as claimed in claim 29 wherein the ink is a water-soluble ink.

31. A printing method as claimed in claim 30 wherein the ink is a water-soluble ink.

32. A printing method as claimed in claim 29 wherein the ink is transferred with an ink jet printer, a sublimation printer, or a thermal transference printer, to the outermost protective layer.

33. A printing method as claimed in claim 32 wherein the ink is transferred with an ink jet printer, a sublimation printer, or a thermal transference printer, to the outermost protective layer.

* * * * *

UNITED STATES PATENT AND TRADEMARK OFFICE
CERTIFICATE OF CORRECTION

PATENT NO. : 5,573,831
DATED : November 12, 1996
INVENTOR(S) : Yuko Suzuki, et al.

It is certified that error appears in the above-identified patent and that said Letters Patent is hereby corrected as shown below:

In claim 13, column 14, line 9, delete "1" and insert --11--.

Signed and Sealed this

Twenty-first Day of April, 1998

Attest:

BRUCE LEHMAN

Attesting Officer          Commissioner of Patents and Trademarks